Jan. 6, 1970  F. G. EGGERT ET AL  3,487,551
BALL JOINT MOTION METER
Original Filed April 19, 1966
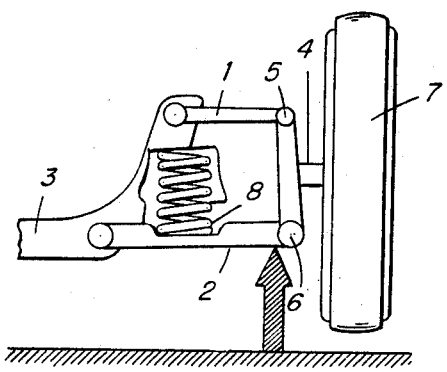
FIG. 1A
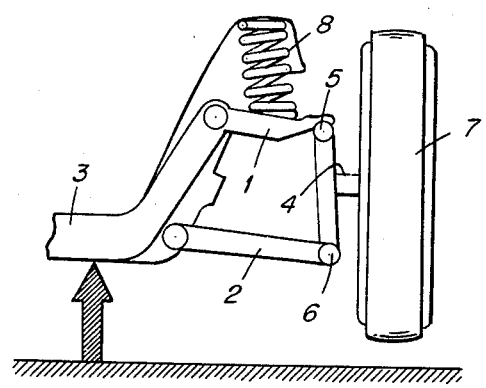
FIG. 1B
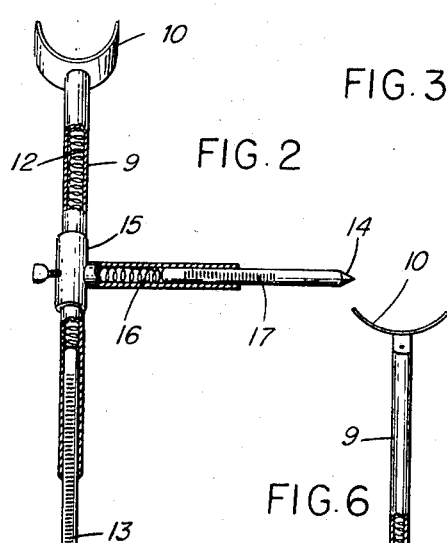
FIG. 2
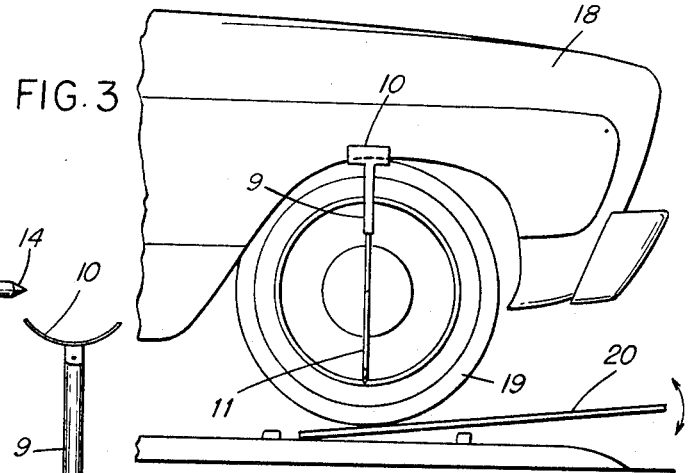
FIG. 3
FIG. 5
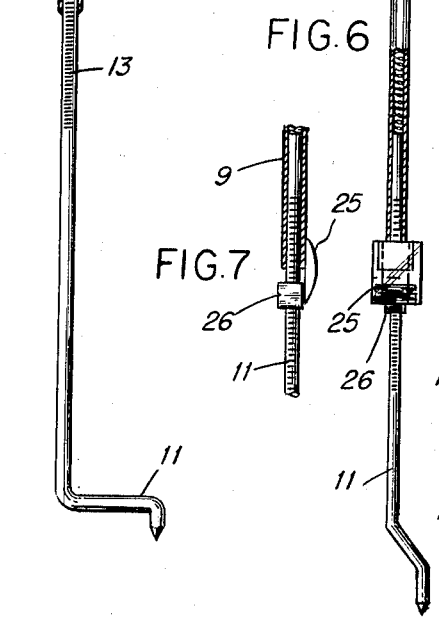
FIG. 6
FIG. 7
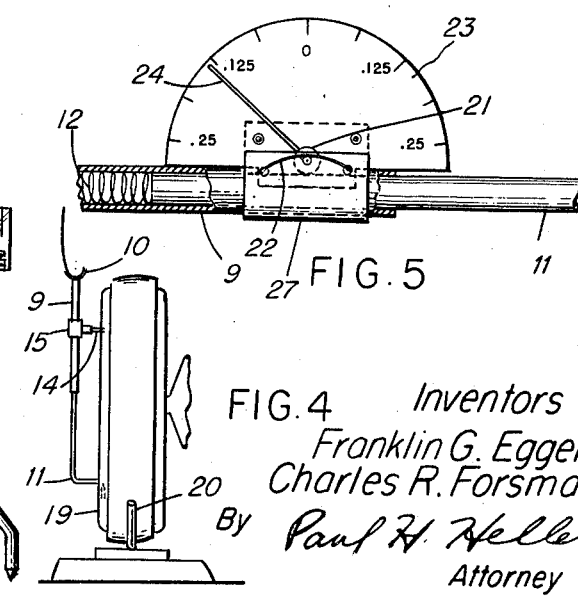
FIG. 4
Inventors
Franklin G. Eggert
Charles R. Forsman
By Paul H. Heller
Attorney

United States Patent Office 3,487,551
Patented Jan. 6, 1970

3,487,551
BALL JOINT MOTION METER
Franklin G. Eggert, Mount Ephriam, and Charles R. Forsman, Woodbury, N.J., assignors to Mobil Oil Corporation, a corporation of New York
Continuation of application Ser. No. 543,566, Apr. 19, 1966. This application Feb. 17, 1969, Ser. No. 802,737
Int. Cl. G01b 5/14
U.S. Cl. 33—143         5 Claims

ABSTRACT OF THE DISCLOSURE

Apparatus for determining the condition of a load carrying ball joint in a ball joint suspension system of a motor vehicle when the ball joint is in an unloaded state comprising a first elongated element for engaging a fender, a second elongated element for engaging a wheel assembly, and means for indicating the relative movement between the first and second members when the wheel assembly is raised to place the load carrying ball joint in a loaded state.

---

This application is a continuation of application Ser. No. 543,566, filed Apr. 19, 1966, now abandoned.

This invention is directed to an apparatus and method for determining the condition of ball joints in automotive vehicles. More particularly, this invention is directed to determining the condition of the load-carrying ball joint in an automotive vehicle by measuring the relative motion between the vehicle body and the vehicle wheel.

A typical front suspension system for a vehicle comprises an upper and lower arm attached to the spindle on which the vehicle wheel rotates. The arms and spindle are connected by ball joints, one of which carries the major share of the vehicle load. This vehicle-loaded ball joint remains firmly seated under all road conditions. After a number of miles of service, however, this ball joint may wear, and sufficient deterioration of the ball joint may result in a dangerous condition. The automobile manufacturers publish ball joint inspection procedures for all makes of vehicles. These procedures were developed because industry sources felt that the operational characteristics of ball joints were being misunderstood by the service industry. Numerous analyses of ball joints that have been replaced as being worn or defective have indicated that in many instances such replacements were unnecessary.

Although many devices are available for accurately determining the condition of ball joints they have not been widely used in service stations. Precise gauges are available which must be fastened to the ball joint supporting arms with elaborate devices from underneath the car. Since this is very difficult and time-consuming, the average mechanic will rely upon his own judgment to determine the condition of ball joints. This is normally done by raising the vehicle underbody and then moving the wheel to qualitatively estimate the looseness of the ball joint. This procedure is not entirely satisfactory especially in a burgeoning industry like the automotive repair business where many mechanics do not have the experience to accurately determine ball joint condition by this qualitative analysis. This is a particularly difficult problem in the new type of diagnostic centers where cars are rapidly examined on a highly scientific basis.

It is therefore an object of this invention to provide a ball joint motion meter and method which will accurately and quickly disclose the condition of ball joints. Other objects of this invention will become apparent from a reading of the following description in conjunction with the accompanying figures.

FIGURE 1A is of a portion of vehicle front suspension system in which the spring is supported by the lower control arm.

FIGURE 1B is of a vehicle suspension system in which the spring is supported by the upper control arm.

FIGURE 2 is an example of the ball joint motion meter of this invention.

FIGURE 3 is a side view of a vehicle to which a ball joint motion meter is attached.

FIGURE 4 is a front view of a vehicle to which the ball joint motion meter is attached.

FIGURES 5, 6 and 7 show indicators which may be used for the ball joint motion meter.

In FIGURES 1A and 1B the general features of a suspension system are shown. The upper control arm 1 and lower control arm 2 are pivotally attached to the frame 3 or cross member of a vehicle. At the other end of the control arms they are pivotally attached to a spindle 4 through ball joints 5 and 6 respectively. The spindle supports the vehicle wheel 7. In FIGURE 1A the lower control arm 2 is connected to the frame 3 through spring 8. In this arrangement the lower ball joint 6 carries the major portion of the vehicle load and is therefore referred to as the load carrying ball joint. The upper ball joint 5 is referred to as the secondary or preloaded ball joint. This ball joint may comprise, for example, a spring type construction which minimizes looseness and compensates for normal wear. In FIGURE 1B the spring 8 connects the upper control arm 1 to the frame 3. In this arrangement the upper ball joint is the load carrying ball joint and the lower ball joint 6 is the secondary or preloaded ball joint. In each of these arrangements it is the load carrying ball joint with which this invention is concerned. The load carrying ball joint is not spring loaded but is firmly seated by the weight of the car. To test for ball joint looseness this load carrying ball joint must be unloaded so that any looseness will become apparent. In FIGURES 1A and 1B the shaded arrow indicates the position from which the car is raised by a jack in order to remove the load from the normal load carrying ball joint to place it in an unloaded state. In FIGURE 1A, the jack should be placed as close to the lower ball joint as is practical. The weight of the vehicle from its body will be transmitted to the frame and then to the lower control arm and then to the jack. In this arrangement the lower control arm will be held rigid but the lower ball joint can be freely moved by movement of the wheel. By means of the jack, in FIGURE 1B, the weight of the vehicle will be distributed from the vehicle body to the frame directly to the jack. The upper control arm will be depressed and held rigid by the spring tension and the weight of the wheel; movement of the upper ball joint will occur upon movement of the wheel. Normally, a support block (not shown) will be positioned between the upper arm and a side rail of the frame.

FIGURE 2 depicts the ball joint motion meter of this invention. The meter comprises an upper tubing shell 9, a body gripping end 10 and a wheel gripping end 11 and means to provide for motion between said ends. In the embodiment shown the tube 9 fits over a slightly smaller shaft attached to the wheel engaging end. A spring 12 is positioned inside the upper tubing shell of the meter. Relative movement between ends 10 and 11 is indicated by calibrations 13 on the wheel engaging portion of the meter. A similar although smaller device depicted next to the meter represents an additional embodiment for determining lateral or radial looseness of the ball joint. This auxiliary device comprises a wheel engaging portion 14 and a vehicle body engaging portion 15 which in this embodiment is attached to the tube 9 of the meter. This auxiliary device also contains a spring 16 to maintain the spacing between ends 14 and 15, and also calibrations 17 to indicate the relative movement between ends 14 and 15.

FIGURE 3 illustrates the use of the ball joint motion meter in determining up and down or axial looseness of a ball joint. The vehicle body 18 is raised by a jack (not shown) and the vehicle wheel 19 is thereby raised a short distance into the air. The meter is then attached in slightly compressed condition with end 10 under the body 18 and with end 11 abutting the rim of the wheel 19. In this position the calibrations of the meter will be read. The pry bar 20 will then be used to raise the wheel and to place the ball joint in a loaded state or condition. At this point the meter will again be read. The relative movement between ends 10 and 11 as determined by the calibrations on the bar are indicative of ball joint axial movement or looseness.

FIGURE 4 shows the use of the motion meter comprising ends 10 and 11 and also the use of the auxiliary device comprising ends 15 and 14. The auxiliary device is attached at end 15 to tube 9 of the meter. End 14 abuts the wheel 19 and is maintained in this position by the force of the spring 16 which is in a compressed condition. In this position the calibrations on the auxiliary meter are recorded. Force is then applied to the top or bottom of the wheel and the in-out movement of the wheel can be read from the auxiliary meter. This reading is proportional to the lateral or radial movement or play in the ball joint.

FIGURE 5 depicts a portion of the meter in which a roller 21 engages bar portion 11. The roller is supported by member 27 which is attached to tube 9. The spring 22 maintains frictional engagement between roller 21 and bar 11. By this arrangement the relative movement between portions 9 and 11 is transmitted to the spring loaded roller 21 and in turn to the pointer 24 which scans the calibrated face of the gauge 23. By this means the meter, or an auxiliary device, when attached to a vehicle as depicted in FIGURE 3 or 4, can be adjusted to zero by manual movement of the pointer. Then when the wheel of such a vehicle is moved, by the pry bar or by hand, the relative movement between the vehicle body and the wheel will be readily discerned from gauge face 23. This construction prevents damage to the meter through over-compression or over-extension of parts 9 and 11 since no positive link exists between the roller 21 and the two sections 9 and 11.

FIGURES 6 and 7 show an embodiment comprising calibration with a convex magnifying lens 25 movably affixed to tube 9 to permit observation of closely spaced calibration marks at a moderate distance, a zero line is etched on the movable magnifying glass to facilitate measurements. A friction-held slider 26 marks one extreme of the motion of the movable rod, and may be used to zero the instrument prior to measurements. In FIGURE 6 a swivel arrangement is shown by which the body-gripping member 10 is attached to the upper tubing shell 9; this improves the adaptability of the device to different vehicles.

Thus there have been described exemplary embodiments for carrying out the measurements of ball joint looseness, both axial movement and radial movement. It will be understood by those skilled in the art that the above described embodiments are exemplary and that they are susceptible of modification and variation without departing from the spirit and scope of the invention.

What is claimed is:

1. A device for indicating the condition in an unloaded state of a load carrying ball joint in a suspension system connecting a spindle of a wheel assembly and a vehicle frame to which is operatively affixed a fender above said wheel assembly, comprising
   means including an upwardly opened member for engaging said fender above said wheel assembly,
   means movable with respect to said fender engaging means and operatively connected thereto including a downwardly extending member and offset means for engaging said wheel assembly, and
   means for indicating relative movement between said fender engaging means and said wheel assembly engaging means when said wheel assembly is raised to place the load carrying ball joint in a loaded state to thereby provide a representation of axial movement of said load carrying ball joint.

2. A device for indicating the condition in an unloaded state of a load carrying ball joint in a suspension system connecting a spindle of a wheel assembly and a vehicle frame to which is operatively affixed a fender above said wheel assembly, comprising:
   means including an upwardly opened member for engaging said fender above said wheel assembly in a vertical plane defined by the longitudinal axis of said spindle,
   means movable with respect to said fender engaging means and operatively connected thereto including a downwardly extending member and offset means adapted to extend in said plane for engaging said wheel assembly, and
   means for indicating relative movement between said fender engaging means and said wheel assembly engaging means when said wheel assembly is raised to place the load carrying ball joint in a loaded state to thereby provide a representation of axial movement of said load carrying ball joint.

3. Apparatus for determining the condition of a load carrying ball joint when said load carrying ball joint is in an unloaded state, said ball joint in a ball joint suspension system interconnecting a vehicle frame and a spindle of a wheel assembly, comprising:
   means for engaging a fender above said wheel assembly,
   means movable with respect to said fender engaging means and operatively connected thereto for engaging said wheel assembly,
   one of said fender engaging means and said wheel engaging means comprising a tubular structure and a spring therein, and the other of said fender engaging means and said wheel assembly engaging means comprising a bar structure one end of which is positioned within said tubular structure and abuts said spring,
   means for indicating relative movement between said fender engaging means and said wheel assembly engaging means when said wheel assembly is raised to place the load carrying ball joint in a loaded state to thereby provide a representation of axial movement of said load carrying ball joint,
   a cylindrical structure having biasing means therein,
   an elongated structure having one end thereof positioned within said cylindrical structure and abutting said biasing means,
   one of said cylindrical structure and said elongated structure being adapted to abut said wheel assembly means and the other of said cylindrical structure and said elongated structure being perpendicularly connected to one of said tubular structure and said bar structure, and
   means for indicating relative movement between said cylindrical structure and said elongated structure when a transverse force is applied to said wheel assembly to thereby provide a representation of radial movement of said load carrying ball joint.

4. As a new use for an instrument having first and second members movable with respect to each other and means for indicating relative movement between said first and second members, a method of determining the condition of a load carrying ball joint in a suspension system connecting a spindle of a wheel assembly and a vehicle frame to which is operatively affixed a fender above said wheel assembly, wherein said first member is adapted to engage said fender and said second member is adapted to engage said wheel assembly, comprising the steps of:
  raising said vehicle frame to place the load carrying ball joint in an unloaded state,
  installing said instrument to engage said fender and said wheel assembly,
  applying an upward force to said wheel assembly to place the load carrying ball joint in a loaded state, and
  determining the relative movement between said first and second members to provide an indication of axial movement of said load carrying ball joint.

5. The method of claim 4 wherein said instrument is installed in a vertical plane defined by the longitudinal axis of said spindle.

References Cited
UNITED STATES PATENTS 1,638,723   8/1927   Barnes.
1,903,051   3/1933   Kennedy.

HARRY N. HAROIAN, Primary Examiner

U.S. Cl. X.R.

33—147, 203.18